United States Patent
Maharaja et al.

(10) Patent No.: US 11,971,900 B2
(45) Date of Patent: Apr. 30, 2024

(54) RULE-BASED DATA TRANSFORMATION USING EDGE COMPUTING ARCHITECTURE

(71) Applicant: Bank of America Corporation, Charlotte, NC (US)

(72) Inventors: Raja Arumugam Maharaja, Tamil Nadu (IN); Khushbu Rani, Bokaro Steel (IN)

(73) Assignee: Bank of America Corporation, Charlotte, NC (US)

( * ) Notice: Subject to any disclaimer, the term of this patent is extended or adjusted under 35 U.S.C. 154(b) by 43 days.

(21) Appl. No.: 17/592,712

(22) Filed: Feb. 4, 2022

(65) Prior Publication Data

US 2023/0252040 A1 Aug. 10, 2023

(51) Int. Cl.
| | |
|---|---|
| *G06F 16/00* | (2019.01) |
| *G06F 16/25* | (2019.01) |
| *G06F 18/2411* | (2023.01) |
| *G06N 3/045* | (2023.01) |
| *G06N 20/10* | (2019.01) |

(52) U.S. Cl.
CPC .......... *G06F 16/258* (2019.01); *G06F 16/254* (2019.01); *G06F 18/2411* (2023.01); *G06N 3/045* (2023.01); *G06N 20/10* (2019.01)

(58) Field of Classification Search
None
See application file for complete search history.

(56) References Cited

U.S. PATENT DOCUMENTS

| | | | |
|---|---|---|---|
| 10,127,250 B2 | 11/2018 | Dingman et al. | |
| 10,379,995 B1* | 8/2019 | Walters | G06T 7/248 |
| 10,693,743 B2* | 6/2020 | Zhong | H04L 43/045 |
| 10,871,922 B2 | 12/2020 | East | |
| 2018/0032908 A1* | 2/2018 | Nagaraju | G06F 11/3409 |
| 2018/0032915 A1* | 2/2018 | Nagaraju | G06V 10/95 |
| 2018/0373766 A1* | 12/2018 | Crabtree | H04L 63/0421 |
| 2019/0286373 A1 | 9/2019 | Karumbunathan et al. | |
| 2019/0317945 A1* | 10/2019 | Ezick | G06F 16/254 |
| 2020/0401607 A1* | 12/2020 | Chan | G06F 11/3442 |
| 2022/0044136 A1* | 2/2022 | Wang | G06N 20/00 |
| 2022/0365910 A1* | 11/2022 | He | G06N 20/00 |

FOREIGN PATENT DOCUMENTS

CN 108141717 B 10/2021

* cited by examiner

*Primary Examiner* — Farhan M Syed
(74) *Attorney, Agent, or Firm* — Banner & Witcoff, Ltd.

(57) ABSTRACT

A system for data processing using machine learning processing and distributed architecture is described. Specifically, proprietary data transformation rules to be applied for the data processing may be stored at edge computing devices, while the bulk of data processing may be performed at a central computing node that houses the databases. A subset of a data set, in the database, may be sent from the central computing node to the edge computing node. The edge computing node may generate a second data set based on applying data transformation rules to the subset of the data set. The central computing node may determine, using a machine learning (ML) algorithm and based on the subset of the data set and the second data set, the data transformation rules, which may then be applied to the rest of the data set.

20 Claims, 6 Drawing Sheets

RULE-BASED DATA TRANSFORMATION USING EDGE COMPUTING ARCHITECTURE

FIELD

Aspects described herein generally relate to the field of data processing and transformation, and more specifically to edge computing systems for data processing.

BACKGROUND

Enterprise organizations often maintain and process large data sets associated with their clients for various purposes. For example, a banking/financial services enterprise may store information associated with its clients, and use the information to provide individualized services and/or perform other functions (e.g., generating loan offers, offering specialized banking facilities, setting interest rates, determining new clients, etc.). The enterprise may use "big data" techniques on an input data set to generate an output data set, which may then be used for enabling these services/operations. Such processing may be based on proprietary rules/algorithms that operate on the input data set which, ideally, must only be accessible to a small set of individuals responsible for designing, modifying, and using them for generating the output data set.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various associated with data processing/transformation at an enterprise network. One or more aspects relate to determination of data transformation rules at a database server (e.g., a central computing node) based on results of their application at an edge computing node. Additional aspects related to obfuscating an edge computing node where data transformation rules are being applied.

In accordance with one or more arrangements, a system may comprise a plurality of edge computing nodes and a central computing node. Each of the edge computing nodes may be associated with a corresponding set of data transformation rules. The central computing node may comprise at least one processor; and memory storing computer-readable instructions that, when executed by the at least one processor, cause the central computing node to perform one or more operations. The central computing node may receive (e.g., from a database) a first data set and determine, an edge computing node, among the plurality of edge computing nodes, for processing the first data set. Then, the central computing node may send, to the edge computing node, a subset of the first data set. The sending the subset of the first data set may cause generating a second data set at the edge computing node based on applying a first set of data transformation rules associated with the edge computing node to the subset of the first data set. The central computing node may receive, from the edge computing node, the second data set. The central computing node may determine, using a machine learning (ML) algorithm and based on the subset of the first data set and the received second data set, a second set of data transformation rules. The central computing node may generate a third data set based on applying the second set of data transformation rules to the first data set, and send, to the edge computing device, at least a subset of the third data set.

In some arrangements, the central computing node may determine the edge computing node based on: sending the first data set to the plurality of edge computing nodes; and receiving, from one or more of the plurality of edge computing nodes, an indication of the edge computing node.

In some arrangements, the central computing node may determine, based on a second ML algorithm, the subset of the first data set. The second ML algorithm may be based on one of: a logistic regression algorithm; a decision tree algorithm; a random forest algorithm; a neural network algorithm; a support vector machine (SVM) algorithm; a clustering algorithm; and combinations thereof.

In some arrangements, the determining the second set of data transformation rules may comprise training a ML model based on the subset of the first data set and the received second data set. The ML model may be based on one of: a logistic regression model; a decision tree model; a random forest model; a neural network; a support vector machine (SVM); and combinations thereof.

In some arrangements, the first set of data transformation rules may comprise at least one rule for determining whether an entry in the subset of the first data set satisfies a condition. In some arrangements, the first set of data transformation rules may comprise at least one rule for generating an output value corresponding to an entry in the subset of the first data set. In some arrangements, the second set of data transformation rules may be the same as the first set of data transformation rules. In some arrangements, the central computing node may send the at least the subset of the third data set to the edge computing device for verification by the edge computing device.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
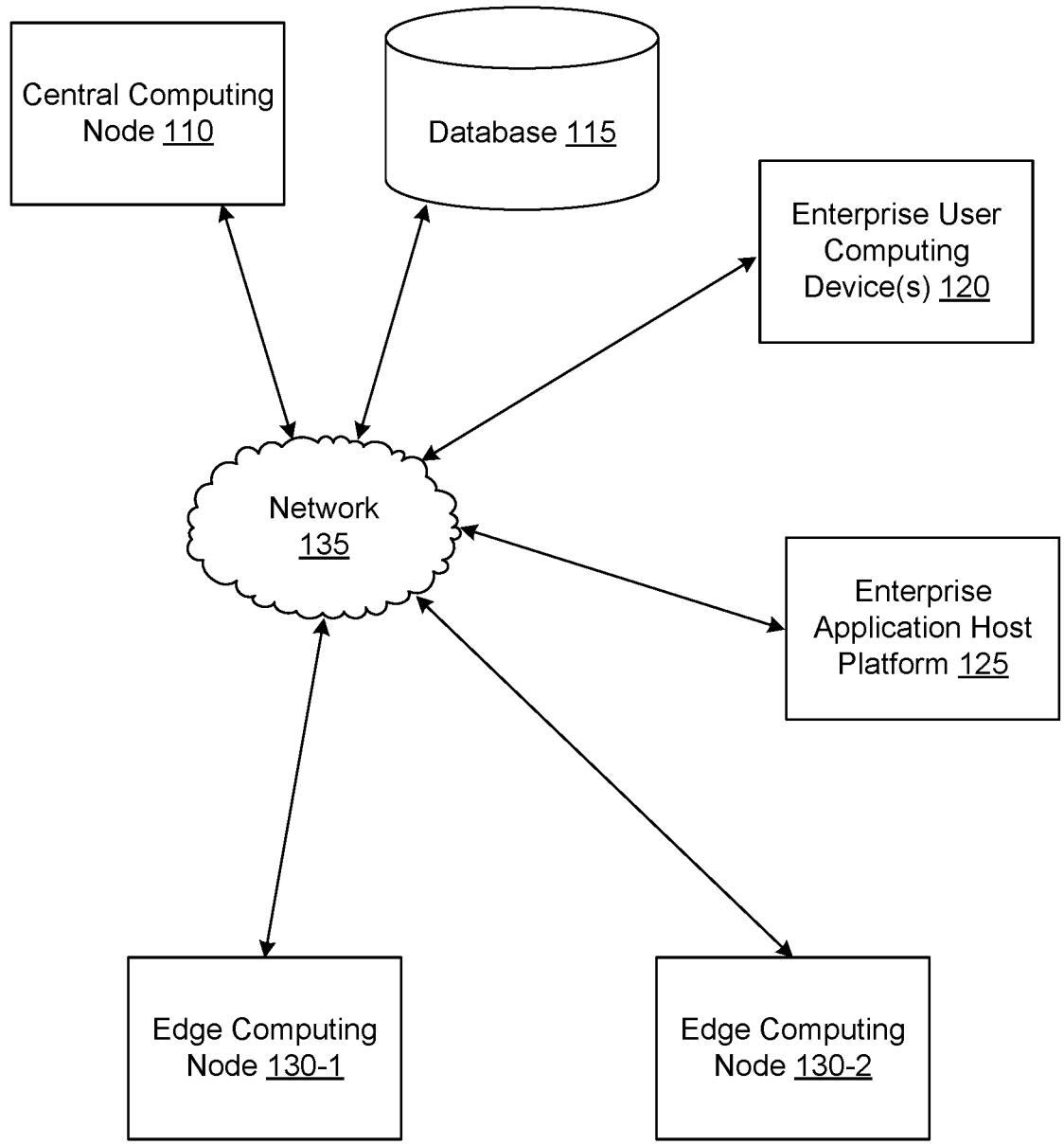
FIG. 1A shows an illustrative computing environment for a data processing system, in accordance with one or more example arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As described above, enterprise organizations may use big data methodologies to process large volumes of data. For example, a banking/financial services organization may need to use big data processing for performing various operations. A database may store records (e.g., entries) associated with each of the clients of the banking organization, where the records may comprise a listing of all transaction performed on the accounts associated with each of the clients. The transactions may comprise any credit transactions, debit transactions, account transfer operations, automatic teller machine (ATM) transactions, etc. Understandably, for any reasonably sized organization, the quantity of such records may number in the billions. The banking organization may perform data processing on these records for determining various metrics (e.g., determining what banking services are more popular, geographical locations where bank clients are more likely to use banking services in, etc.), for marketing purposes (e.g., generating loan offers, offering specialized banking facilities, setting interest rates, determining new clients), etc. The data processing may involve application of propriety rules/algorithms (also referred herein as data transformation rules) to the records, which may typically be done by a collection of computers. The application of propriety rules/algorithms may result in generation of new data based on the records/entries.

Consider the specific example where the data processing comprises determining clients who may be eligible for a bank loan and further determining the specifics of a loan offer (e.g., interest rate and a loan amount). The rules associated with determining the eligible clients and the specifics of the loan offer may indicate the specific conditions for such determination. The conditions may relate/be applied to transactions performed by the clients. For example, a first client may be determined to be eligible for a loan offer at a first interest rate based on application of the rules to the transactions associated with the first client. A second client may be determined to be eligible for a loan offer at a second interest rate based on application of the rules to the transactions associated with the second client. A third client may be determined to be not eligible for a loan offer based on application of the rules to the transactions associated with the third client. The rules may be similarly applied to transactions associated with all clients or a subset of clients.

Data being processed by enterprise organizations may comprise millions or billions of records, and the processing may involve substantial manual operation and oversight. This is disadvantageous as there is a risk that proprietary rules/algorithms may be leaked by a malicious actor who may have access to them. Further, large organizations typically have offices in different locations. An office handling the big data processing may be separate from an office that is a source of the data and/or an office that is responsible for generation of the rules to be applied for the data processing. Thus, the data and/or the rules may need to be sent electronically, from other offices, to the office handling the big data processing. Electronic transmission of data and/or the rules may expose them to leakage and/or interception. Consequently, the issues associated with big data processing relate to maintaining secrecy of the proprietary rules, while also enabling the rules to be applied for data processing.

Various examples herein describe the use of a zero-knowledge proof system for storage and application of data transformation rules to a database. The data transformation rules may be stored in a computing node (e.g., an edge computing node) that is different from a central computing node that houses the database on which the rules are to be applied. The central computing node may send a subset of the database to the edge computing node, where the data transformation rules may be applied. The results of the application of the data transformation rules may be sent to the central computing node. The zero-knowledge proof system enables the central computing node to, using ML, determine (e.g., reverse-engineer) the data transformation rules to be applied to the database based on the results of application of the data transformation rules, at the edge computing node, to the subset of the database. The central computing node may then apply the data transformation rules to the entire database. In this manner, the data transformation rules need not be directly sent to the central computing node for processing and can be securely stored only at the edge computing node.

Additional examples herein describe a distributed system for determining an edge computing node which stores the transformation rules for a particular data set/database. For example, an enterprise organization may have multiple different business units, with each business unit developing corresponding data transformation rules for their use. Each business unit may have a corresponding edge computing node storing the corresponding data transformation rules associated with that business unit. Each of the edge computing nodes may also store information that may assist the edge computing nodes to determine which of the edge computing nodes stores the data transformation rules that may be applied to the database. The edge computing nodes may send an indication of the determined edge computing node to the central computing node, which may then send the subset of the database to the determined edge computing node.

The techniques described herein may enable storage of the data transformation rules at edge computing nodes that are associated with business units/office responsible for their development and maintenance. This may avoid storage of the data transformation rules at the central computing node, thereby limiting its access to a larger group of users. Further, the edge computing node may have limited connectivity to internet. For example, the edge computing node may only connect to the internet for downloading the subset of the database on which the rules are to be applied, and for uploading the results of the application to the central node. Limited connectivity of the edge computing node may enhance the security of the data transformation rules.

FIG. 1A shows an illustrative computing environment 100 for a data processing system, in accordance with one or more arrangements. The computing environment 100 may comprise one or more devices (e.g., computer systems, communication devices, and the like) and may be associated with an enterprise organization (e.g., a banking/financial institution). The computing environment 100 may comprise, for example, a central computing node 110, a database 115, an enterprise application host platform 125, one or more edge computing nodes 130, and/or one or more enterprise user computing devices 120. The one or more of the devices and/or systems, may be linked over a network 135. The network 135 may comprise one or more private networks (e.g., associated with the enterprise organization) or public networks. The devices in the computing environment 100 may transmit/exchange/share information via hardware and/or software interfaces using one or more communication protocols over the network 135. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WWI protocol, a $3^{rd}$ Generation Partnership Project (3GPP) cellular protocol, a hypertext transfer protocol (HTTP), and the like).

The central computing node 110 and/or the one or more edge computing node(s) 130 may comprise one or more computing devices and/or other computer components (e.g., processors, memories, communication interfaces) configured to perform one or more functions as described herein. The central computing node 110 may be associated with an office that may be responsible for big data processing. The edge computing node(s) 130 may correspond to different offices/divisions, each with its own sets of data transformation rules that may be applied to data being processed at the central computing node 110. For example, in an arrangement where the computing environment 100 is associated with a banking organization, a first edge computing node 130-1 may be associated with a loan processing division of and may comprise data transformation rules for processing loan applications/offering loans to clients. A second edge computing node 130-2 may be associated with a card processing division and may comprise data transformation rules for processing credit card applications and managing existing credit card user accounts. Further details associated with the architecture of the central computing node 110 and/or the edge computing node(s) 130 are described with reference to FIG. 1B and FIG. 4.

The enterprise application host platform 125 may comprise one or more computing devices and/or other computer components (e.g., processors, memories, communication interfaces). In addition, the enterprise application host platform 125 may be configured to host, execute, and/or otherwise provide one or more enterprise applications. In an arrangement where the computing environment 100 is associated with a banking organization, the enterprise application host platform 125 may be configured, for example, to host, execute, and/or otherwise provide one or more transaction processing programs, such as an online banking application, fund transfer applications, and/or other programs associated with the financial institution. In addition, the enterprise application host platform 125 may process and/or otherwise execute transactions on specific accounts based on commands and/or other information received from other computer systems (e.g., enterprise user computing device(s) 120) comprising the computing environment 100.

The database 116 may comprise various servers and/or databases that store and/or otherwise maintain information that may processed (e.g., as per data transformation rules) by the various computing nodes in the computing environment 100. In an arrangement where the computing environment 100 is associated with a banking organization, the database 115 may comprise account information, such as financial account information including account balances, transaction history, account owner information, and/or other information.

The enterprise user computing device(s) 120 may be personal computing devices (e.g., desktop computers, laptop computers) or mobile computing devices (e.g., smartphones, tablets). In addition, the enterprise user computing device(s) 120 may be linked to and/or operated by specific enterprise users (who may, for example, be employees or other affiliates of the enterprise organization). An authorized user (e.g., responsible for data transformation rules) associated with an edge computing node 130 may use an enterprise user computing device 120 to interact and/or modify corresponding data transformation rules. A user associated with the central computing node 110 may use an enterprise user computing device 120 to review results of data processing based on the data transformation rules.

In one or more arrangements, the central computing node 110, the database 115, the enterprise application host platform 125, the one or more edge computing nodes 130, the one or more enterprise user computing devices 120, and/or the other devices/systems in the computing environment 100 may be any type of computing device capable of receiving input via a user interface, and communicating the received input to one or more other computing devices in the computing environment 100. For example, the central computing node 110, the database 115, the enterprise application host platform 125, the one or more edge computing nodes 130, the one or more enterprise user computing devices 120, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the central computing node 110, the database 115, the enterprise application host platform 125, the one or more edge computing nodes 130, the one or more enterprise user computing devices 120, and/or the other devices/systems in the computing environment 100 may, in some instances, be and/or comprise special-purpose computing devices configured to perform specific functions.

Figure 1B:
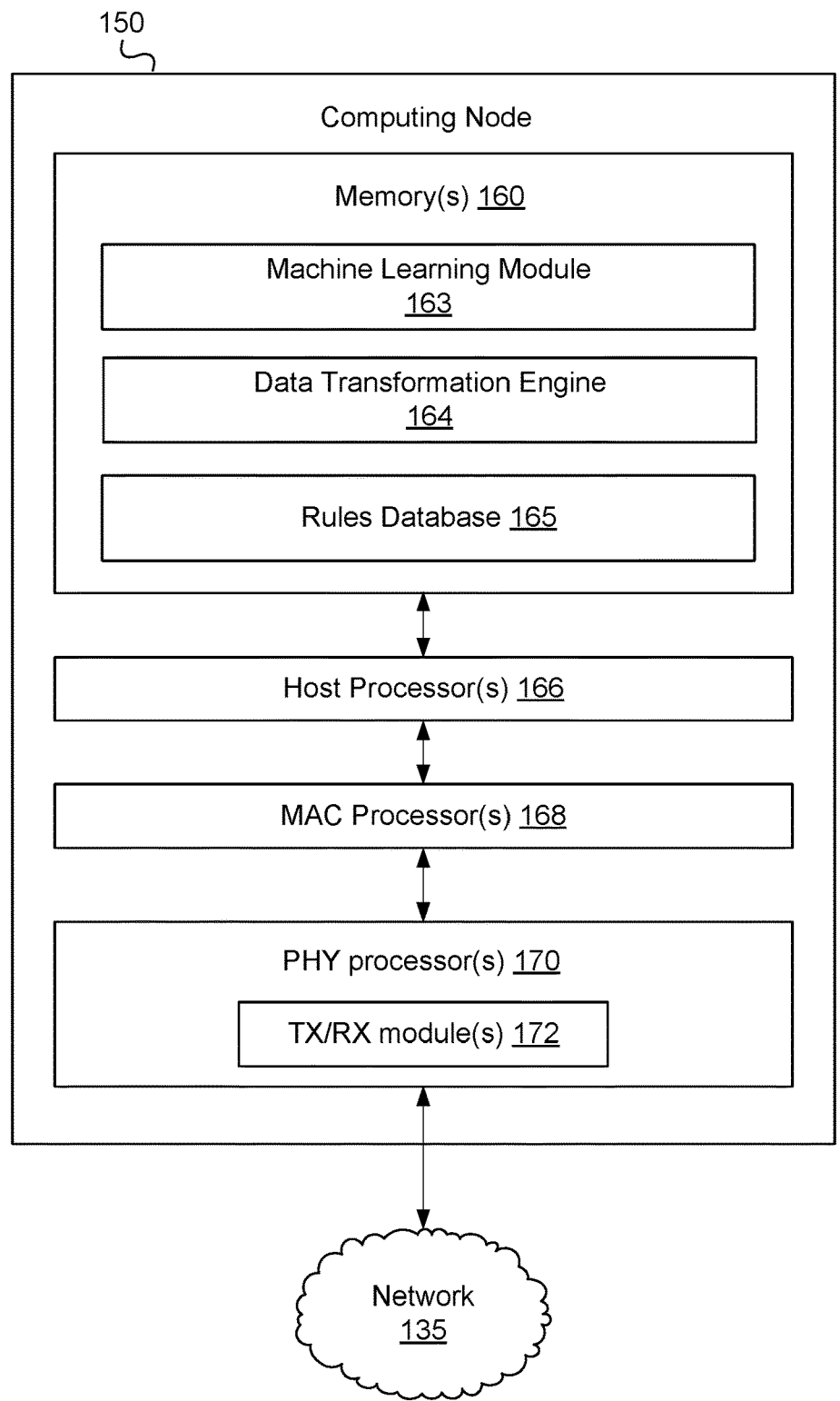
FIG. 1B shows an example computing node for the data processing system, in accordance with one or more example arrangements.

FIG. 1B shows an example computing node 150 in accordance with one or more examples described herein. The example computing node 150 may correspond to the central computing node 110 and/or the one or more edge computing node(s) 130. The computing node 150 may comprise one or more of host processor(s) 166, medium access control (MAC) processor(s) 168, physical layer (PHY) processor(s) 170, transmit/receive (TX/RX) module(s) 172, memory 160, and/or the like. One or more data buses may interconnect host processor(s) 166, MAC processor(s) 168, PHY processor(s) 170, and/or Tx/Rx module(s) 172, and/or memory 160. The computing node 150 may be implemented using one or more integrated circuits (ICs), software, or a combination thereof, configured to operate as discussed below. The host processor(s) 166, the MAC processor(s) 168, and the PHY processor(s) 170 may be implemented, at least partially, on a single IC or multiple ICs. Memory 160 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 168 and/or the PHY processor(s) 170 of the computing node 150 may be configured to generate data units, and process received data units, that conform to any suitable wired and/or wireless communication protocol. For example, the MAC processor(s) 168 may be configured to implement MAC layer functions, and the PHY processor(s) 170 may be configured to implement PHY layer functions corresponding to the communication protocol. The MAC processor(s) 168 may, for example, generate MAC data units (e.g., MAC protocol data units (MPDUs)), and forward the MAC data units to the PHY processor(s) 170. The PHY processor(s) 170 may, for example, generate PHY data units (e.g., PHY protocol data units (PPDUs)) based on the MAC data units. The generated PHY data units may be transmitted via the TX/RX module(s) 172 over the private network 135. Similarly, the PHY processor(s) 170 may receive PHY data units from the TX/RX module(s) 172, extract MAC data units encapsulated within the PHY data units, and forward the extracted MAC data units to the MAC processor(s). The MAC processor(s) 168 may then process the MAC data units as forwarded by the PHY processor(s) 170.

One or more processors (e.g., the host processor(s) 166, the MAC processor(s) 168, the PHY processor(s) 170, and/or the like) of the computing node 150 may be configured to execute machine readable instructions stored in memory 160. The memory 160 may comprise one or more program modules/engines having instructions that when executed by the one or more processors cause the computing node 150 to perform one or more functions described herein. The one or more program modules/engines and/or databases may be stored by and/or maintained in different memory units of the computing node 150 and/or by different computing devices that may form and/or otherwise make up the computing node 150. For example, the memory 160 may have, store, and/or comprise a machine learning module 163, a data transformation engine 164, and/or the rules database 165. The machine learning module 163 may have instructions that may cause the computing node 150 to implement machine learning processes in accordance with the examples described herein. For example, if the computing node 150 corresponds to the central computing node 110, the machine learning module 163 may use received data sets (e.g., as generated at an edge computing node) to determine data transformation rules as may have been used for generating the data sets. As another example where the computing node 150 corresponds to the central computing node 110, the machine learning module 163 may determine a subset of a data set to be sent to an edge computing node 130 for processing as per the data transformation rules corresponding to the edge computing device 130. If the computing node 150 corresponds to the edge computing node 110, the machine learning module 163 may determine whether the subset of the data set is sufficient for processing as per the data transformation rules corresponding to the edge computing device 130.

The machine learning module 163 may receive data and, using one or more machine learning algorithms, may generate one or more machine learning datasets (e.g., AI models) for the functions described herein. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

The data transformation engine 164 may have instructions that may cause the computing node 150 to perform data processing on a data set. The rules database 165 may comprise data transformation rules that may be used for data processing by the data transformation engine 164.

While FIG. 1A illustrates the central computing node 110, the database 115, the enterprise application host platform 125, the one or more edge computing nodes 130, the one or more enterprise user computing devices 120, as being separate elements connected in the network 135, in one or more other arrangements, functions of one or more of the above may be integrated in a single device/network of devices. For example, elements in the computing node 150 (e.g., host processor(s) 166, memory(s) 160, MAC processor(s) 168, PHY processor(s) 170, TX/RX module(s) 172, and/or one or more program/modules stored in memory(s) 160) may share hardware and software elements with and corresponding to, for example, the enterprise application host platform 125, the database 115, and/or the enterprise user devices 120.

Figure 2:
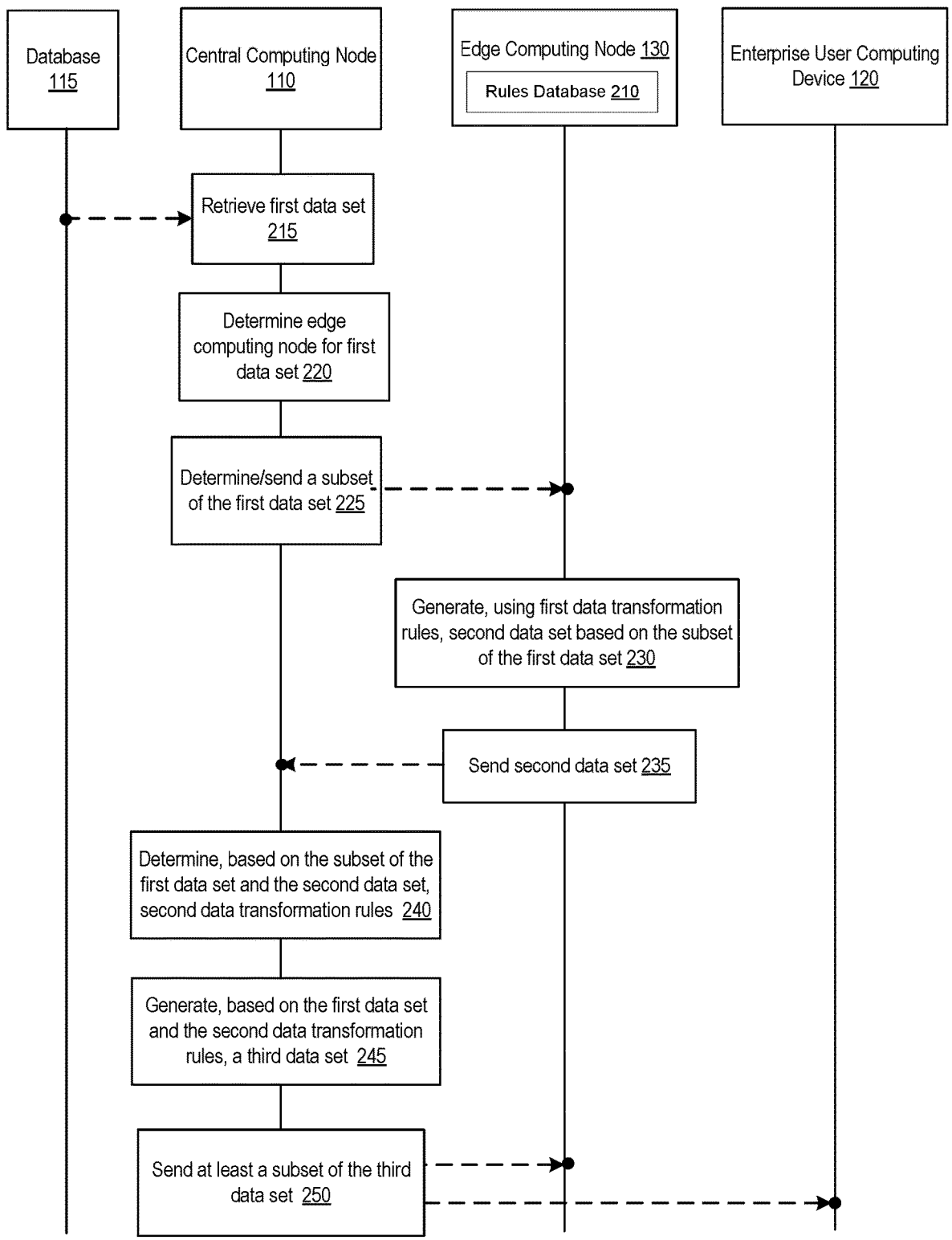
FIG. 2 shows an example event sequence for rule-based data processing using a distributed architecture, in accordance with one or more example arrangements.

FIG. 2 shows an example event sequence for rule-based data processing using a distributed architecture, in accordance with one or more example arrangements. At step 216, the central computing node 110 may retrieve, from the database 115, a first data set. The first data set may comprise a plurality of records/entries. For example, with reference to example discussed above, the plurality of records may correspond to transaction information associated with a plurality of clients of the enterprise organization.

At step 220, the central computing node 220 may determine/identify an edge computing node 130 corresponding to the first data set. The edge computing node 130 may store data transformation rules for processing the first data set. In an arrangement, a user associated with the central computing node 110 may input (e.g., via a user interface) an identifier of the edge computing node 130. In another arrangement, the central computing node may determine the edge computing node 130 based on procedures further described with respect to FIG. 4.

At step 225, the central computing node 110 may determine a subset of the first data set. For example, the central computing node may use a machine learning algorithm to determine a subset of the first data set. The machine learning algorithm may determine the subset based on a determination that the subset does not have confidential data (e.g., customer identification information, names, addresses, etc.). In an arrangement, the machine learning algorithm may be trained to randomly select a subset of the plurality of records in the first data set (e.g., 1 in 1000 records, 1 in 10000 records, etc.), identify potential confidential information (e.g., using a natural language processing (NLP) algorithm) in the subset, and remove the potential confidential information. The central computing node 110 may then send the subset of the plurality of records in the first data set to the edge computing node 130.

At step 230, the edge computing node 130 may generate, using first data transformation rules (e.g., as stored in the rules database), a second data set based on the subset of the first data set. For example, the edge computing node 130 may apply the first data transformation rules to the subset of the plurality of records to generate the second data set comprising a second plurality of records. At step 235, the edge computing node 130 may send, to the central computing node, the second data set.

With reference to the previous example where the data processing comprises determining clients who may be eligible for a bank loan and further determining the specifics of a loan offer (e.g., interest rate and a loan amount), the plurality of records may comprise historical transactions associated with clients of a banking organization. The subset of the plurality of records may comprise historical transactions associated with a selected subset of the clients. The first data transformation rules may indicate rules/conditions to be applied to a client's transactions to determine whether they are eligible for a bank loan and, if eligible, the specifics of the loan offer. The second plurality of records may indicate, for each of the subset of the clients, an indication of whether or not a client is eligible for a loan and, if eligible, the specifics of the loan offer.

At step 240, the central computing node 240 may determine, based on the second data set and the subset of the first data set, and using a machine learning algorithm, second data transformation rules. Determining the second data transformation rules may comprise generating an algorithm that will result, based on an input of the subset of the first data set, an output of the second data set. As an example, determining the second data transformation rules may comprise training a machine learning engine, using supervised machine learning approaches, to determine an output of the second data set based on an input of the subset of the first data set. For example, the subset of the first data set along with the second data set may be used to train a neural network that will mimic application of the data transformation rules of the edge computing node 130.

At step 245, the second data transformation rules may be applied to the remainder of the first data set (e.g., records which were not sent at step 225 to the edge computing node 130). For example, the central computing node 110 may generate, based on the first data set and the second data transformation rules, a third data set. The central computing node 110 may apply the second data transformation rules to the first data set to generate the third data set comprising a third plurality of records. In this manner, the central computing node 240 may use the received second data set as a base for processing the entirety of the first data set.

At step 250, the central computing node 110 may send at least a subset of the third data set for verification to the edge computing node 130. For example, the central computing node 110 may send, to the edge computing node 130, (i) one or more first records from the plurality of records in the first data set, and (ii) one or more second records generated based on application of the second data transformation rules to the one or more first records. The edge computing node 130 may apply the first data transformation rules to the one or more first records to generate one or more third records. The edge computing node 130 may compare the one or more third records with the one or more second records. Ideally, the first data transformation rules and the second data transformation rules should be identical, which would result in the one or more third records being the same as the one or more second records. However, and as further described with respect to FIG. 3, the edge computing node 130 and central computing node 110 may iterate the processes of steps 225-245 to tune the second data transformation rules to more accurately mimic the first data transformation rules, if needed. At step 250, the central computing node 110 may (e.g., additionally or alternatively) send at least a subset of the third data set for review to an enterprise user computing device 120.

Figure 3:
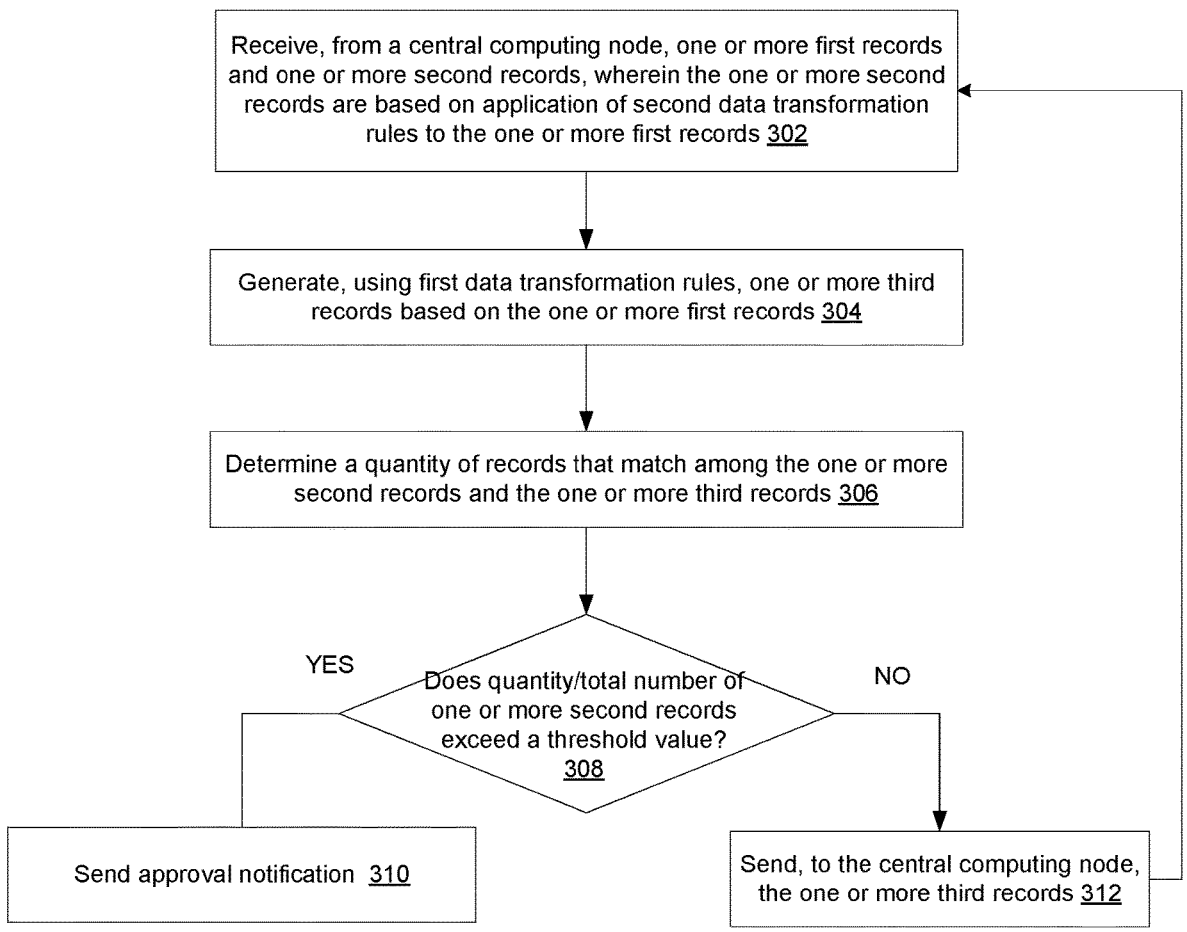
FIG. 3 shows an example method for iteratively determining data transformation rules at a central computing node, in accordance with one or more example arrangements.

FIG. 3 shows an example algorithm, employed at an edge computing node, for iteratively determining/tuning data transformation rules used at a central computing node. The example method 300 of FIG. 3 may be performed at the edge computing node 130. At step 302 (and as described above with respect to step 250), an edge computing node (e.g., the edge computing node 130) may receive (i) one or more first records from the plurality of records in the first data set, and (ii) one or more second records generated based on application of the second data transformation rules, to the one or more first records, at the central computing node. At step, 304, the edge computing node may apply the first data transformation rules to the one or more first records to generate one or more third records.

At step 306, the edge computing node may compare the one or more third records and the one or more second records to estimate how accurately the second data transformation rules match the first data transformation rules. The edge computing node may determine a quantity of records that match (e.g., are the same) among the one or more third records and the one or more second records. The measure of how well the second data transformation rules match the first data transformation rules may be determined as a ratio of the quantity of matching records and a quantity of the one or more second/third records (e.g., the quantity of the one or more second records may be the same as the quantity of the one or more third records).

At step 308, the edge computing node may determine whether the ratio exceeds a threshold value. At step 310, the edge computing node may send an approval notification 310 (e.g., to the central computing node) if the ratio exceeds or is equal to a threshold value (e.g., 0.7, 0.8, or any other value). Based on receiving the approval notification, the central computing node 310 may determine that it has generated an accurate representation of the first data transformation rules.

At step 312, the edge computing node may send, to the central computing node, the one or more third records if the ratio is less than the threshold value. The central computing node may use the one or more third records and the one or more first records for re-training its machine learning engine. Steps 302-312 may be repeated until the second data transformation rules sufficiently match the first data transformation rules (e.g., ratio exceeding or equal to the threshold).

Figure 4:
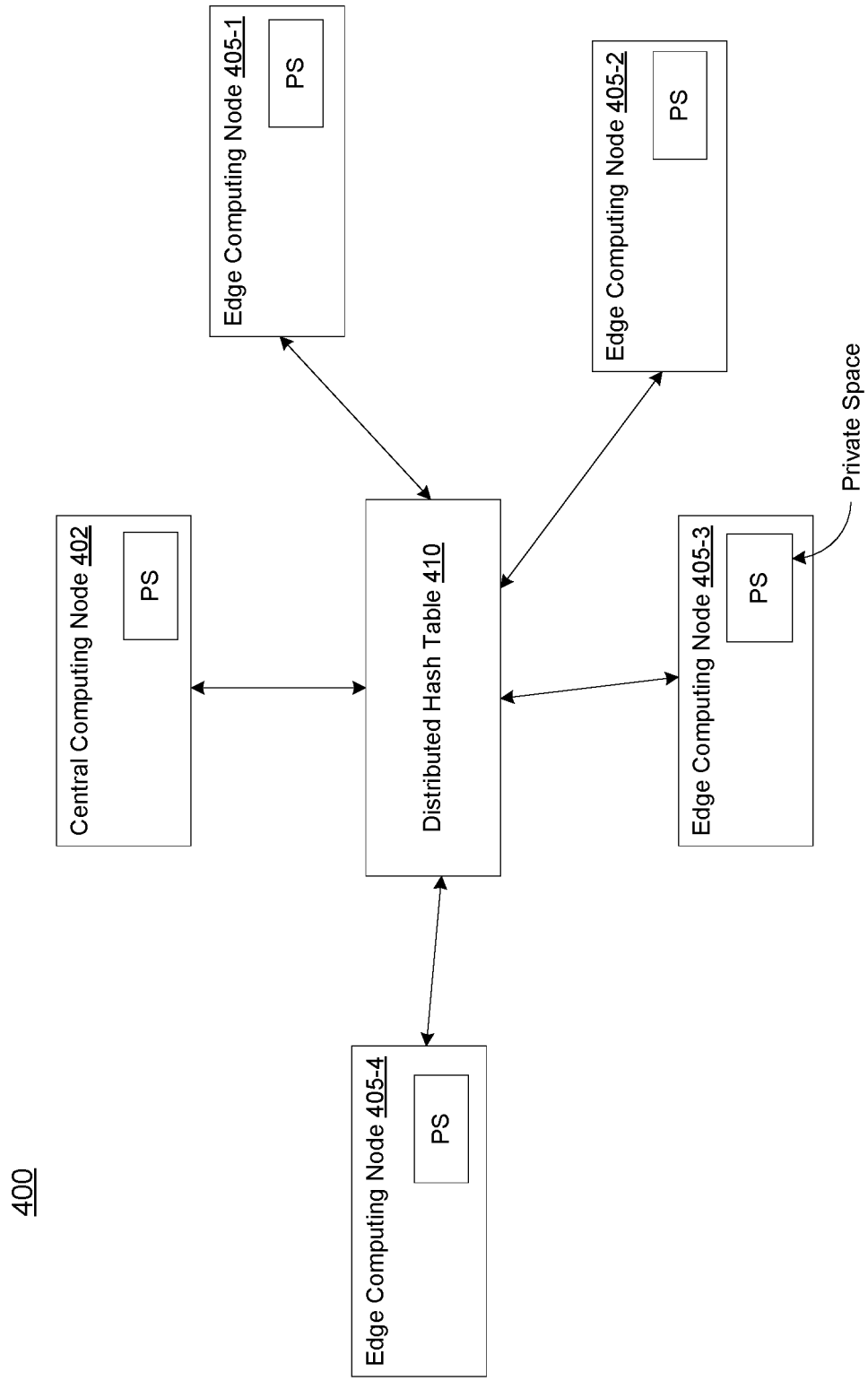
FIG. 4 shows example architecture comprising multiple computing nodes for data processing, in accordance with one or more example arrangements.

FIG. 4 shows an example architecture 400 comprising multiple computing nodes for data processing. The multiple nodes may comprise a central computing node 402 (e.g., corresponding to the central computing node 110 of FIGS. 1A and 2), and a plurality of edge computing nodes 405 (e.g., corresponding to the edge computing nodes 130-1, 130-2, etc., of FIGS. 1A and 2). Each of the edge computing nodes 405 may correspond to different offices/groups/units within the enterprise organization. Each of the edge computing nodes 405 may comprise/be associated with corresponding data transformation rules that may be used by the corresponding office/group/unit for processing an input data set (e.g., as received from the central computing node 402).

For example, in an arrangement where the architecture 400 is associated with a banking organization, a first edge computing node 405-1 may be associated with a loan processing division of and may comprise data transformation rules for processing loan applications/offering loans to clients. A second edge computing node 405-2 may be associated with a card processing division and may comprise data transformation rules for processing credit card applications and managing existing credit card user accounts. A second edge computing node 405-3 may be associated with a deposits division and may comprise data transformation rules for processing and managing banking deposits, etc.

The multiple computing nodes each maintain a local copy of the distributed hash table 410. That is, the distributed hash table 410 is replicated in each of the computing nodes. The distributed hash table 410 is used to send data for processing to the edge computing nodes 405, and return the processed data (e.g., processed as per data transformation rules at an edge computing node) to the central computing node 402.

The distributed hash table 410 enables the central computing node 402 to be unaware of which one of edge computing nodes 405 is processing a data set as sent by the central computing node (e.g., as sent at step 225). The central computing node 402 may send the data set (e.g., a subset of a data set as described with respect to FIG. 2, as described with respect to FIG. 3) to the distributed hash table 410. Sending the data set to the distributed hash table 410 comprises sending the data set to each of the edge computing nodes 405.

Each of the edge computing nodes 405 may analyze the data set to determine whether the data set is to be processed by it. For example, the edge computing node 405-1 may analyze the column names used for/attributes associated with the records in the data set to determine whether the data set corresponds to data that may be processed by its data transformation rules. If an edge computing node determines that the data may be processed by its data transformation rules, the edge computing node may simply process the data set as described with respect to FIGS. 2 and 3. If an edge computing node determines that the data may not be processed by its data transformation rules, the edge computing node may ignore/not process the data set. In this manner, the central computing node 402 need not know which of the edge computing nodes processed the data set/stores the data transformation rules for the data set, thereby providing an additional layer of security.

Additionally, or alternatively, each of the edge computing nodes 405 may comprise a private space (e.g., PS) which may comprise metadata about other nodes. The metadata may comprise information about the type of data other edge computing nodes 405 may process and/or presence of other edge computing nodes 405 in the network. The PS may be used by the edge computing nodes 405 to determine which one of the edge computing nodes may be used to process the data set. For example, the edge computing nodes 405 may send, to the central computing node 402, an indication of the edge computing node (e.g., a server indicator of the edge computing node) that may process the data set. The central computing node 402 may send the data set to the edge computing node corresponding to the server indicator.

Figure 5:
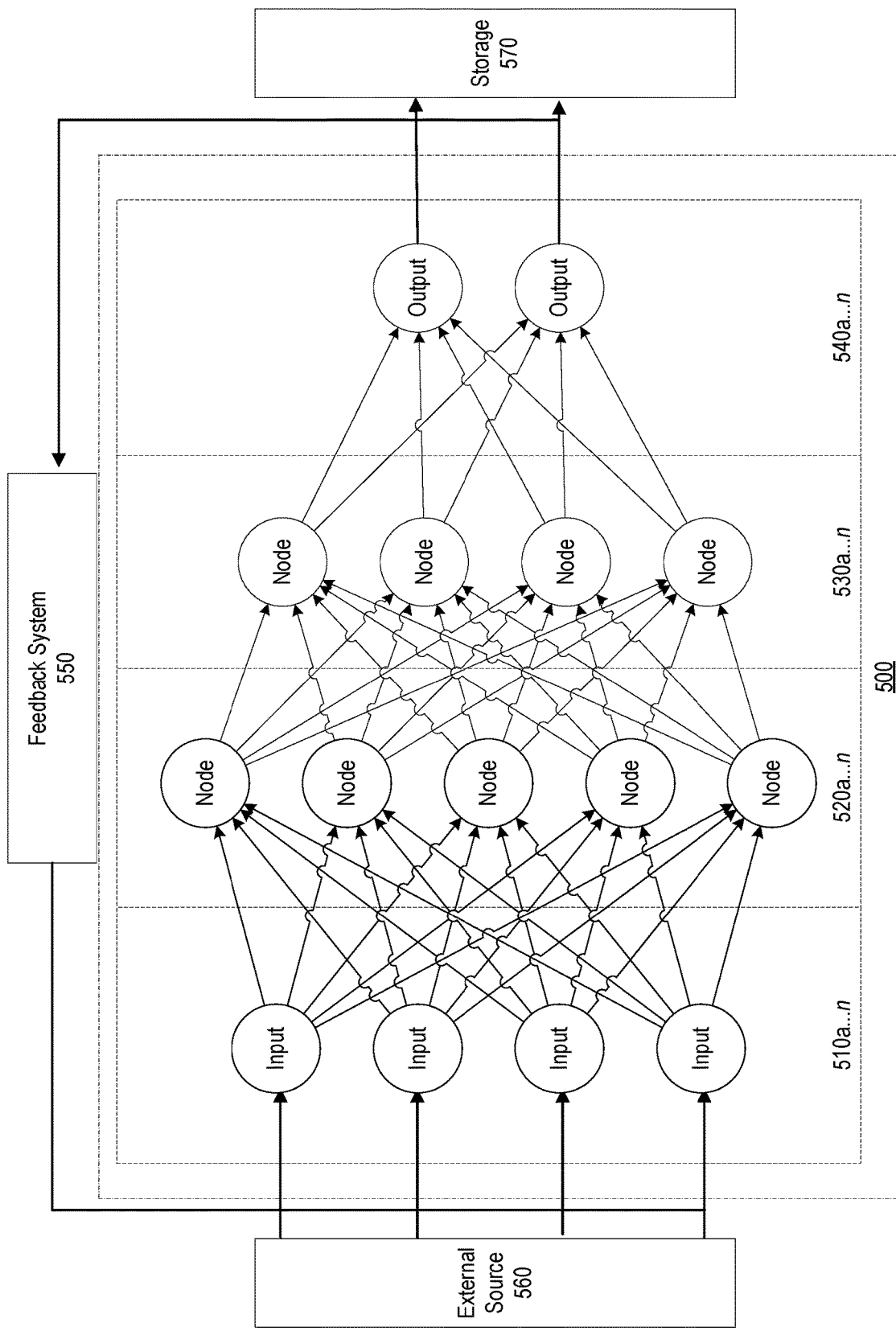
FIG. 5 shows a simplified example of an artificial neural network on which a machine learning algorithm may be executed, in accordance with one or more example arrangements.

FIG. 5 illustrates a simplified example of an artificial neural network 500 on which a machine learning algorithm may be executed, in accordance with one or more example arrangements. One or more of the aforementioned processes may use the artificial neural network 500 to implement a machine learning algorithm. For example, the artificial neural network 500 may be used at the central computing node 110 to generate the second data transformation rules. As another example, the artificial neural network 500 may be used at the central computing node 110 and may be trained to mimic application of the first data transformation rules (e.g., as being applied at an edge computing node). FIG. 5 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 1000 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "55% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (5) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 5, each of input nodes 510a-n is connected to a first set of processing nodes 520a-n. Each of the first set of processing nodes 520a-n is connected to each of a second set of processing nodes 530a-n. Each of the second set of processing nodes 530a-n is connected to each of output nodes 540a-n. Though only two sets of processing nodes are shown, any number of processing nodes may be implemented. Similarly, though only four input nodes, five processing nodes, and two output nodes per set are shown in FIG. 5, any number of nodes may be implemented per set. Data flows in FIG. 5 are depicted from left to right: data may be input into an input node, may flow through one or more processing nodes, and may be output by an output node. Input into the input nodes 510a-n may originate from an external source 560.

In one illustrative method using feedback system 550, the system may use machine learning to determine an output. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality. Output may be sent to a feedback system 550 and/or to storage 570.

In an arrangement, where the neural network 500 is used for determining the second data transformation rules, the input may be the subset of the first data set and the second data set, and the output may be the second data transformation rules. In another arrangement, the neural network may be trained using the subset of the first data set and the second data set as training data. The neural network 500 may process the first data set as applied at the input nodes and weights of each of the layers may be adjusted (as further described below) such that the output is equal to the second data set.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (5) optimizing a sampling method, such as using a stochastic gradient descent (SGD) method where instead of feeding an entire dataset to the machine learning algorithm for the computation of each step, a subset of data is sampled sequentially.

In one example, FIG. 5 depicts nodes that may perform various types of processing, such as discrete computations, computer programs, and/or mathematical functions implemented by a computing device. For example, the input nodes 510a-n may comprise logical inputs of different data sources, such as one or more data servers. The processing nodes 520a-n may comprise parallel processes executing on multiple servers in a data center. And, the output nodes 540a-n may be the logical outputs that ultimately are stored in results data stores, such as the same or different data servers as for the input nodes 510a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 500 may learn and/or be dynamically reconfigured. Though nodes are depicted as having connections only to successive nodes in FIG. 5, connections may be formed between any nodes. For example, one processing node may be configured to send output to a previous processing node.

Input received in the input nodes 510a-n may be processed through processing nodes, such as the first set of processing nodes 520a-n and the second set of processing nodes 530a-n. The processing may result in output in output nodes 540*a-n*. As depicted by the connections from the first set of processing nodes 520*a-n* and the second set of processing nodes 530*a-n*, processing may comprise multiple steps or sequences. For example, the first set of processing nodes 520*a-n* may be a rough data filter, whereas the second set of processing nodes 530*a-n* may be a more detailed data filter.

The artificial neural network 500 may be configured to effectuate decision-making. As a simplified example for the purposes of explanation, the artificial neural network 500 may be configured to detect faces in photographs. The input nodes 510*a-n* may be provided with a digital copy of a photograph. The first set of processing nodes 520*a-n* may be each configured to perform specific steps to remove non-facial content, such as large contiguous sections of the color red. The second set of processing nodes 530*a-n* may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 500 may then predict the location on the face. The prediction may be correct or incorrect.

The feedback system 550 may be configured to determine whether or not the artificial neural network 500 made a correct decision. Feedback may comprise an indication of a correct answer and/or an indication of an incorrect answer and/or a degree of correctness (e.g., a percentage). For example, in the facial recognition example provided above, the feedback system 550 may be configured to determine if the face was correctly identified and, if so, what percentage of the face was correctly identified. The feedback system 550 may already know a correct answer, such that the feedback system may train the artificial neural network 500 by indicating whether it made a correct decision. The feedback system 550 may comprise human input, such as an administrator telling the artificial neural network 500 whether it made a correct decision. The feedback system may provide feedback (e.g., an indication of whether the previous output was correct or incorrect) to the artificial neural network 500 via input nodes 510*a-n* or may transmit such information to one or more nodes. The feedback system 550 may additionally or alternatively be coupled to the storage 570 such that output is stored. The feedback system may not have correct answers at all, but instead base feedback on further processing: for example, the feedback system may comprise a system programmed to identify faces, such that the feedback allows the artificial neural network 500 to compare its results to that of a manually programmed system.

The artificial neural network 500 may be dynamically modified to learn and provide better input. Based on, for example, previous input and output and feedback from the feedback system 550, the artificial neural network 500 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 500, such that the artificial neural network 500 may vary its nodes and connections to test hypotheses.

The artificial neural network 500 need not have a set number of processing nodes or number of sets of processing nodes, but may increase or decrease its complexity. For example, the artificial neural network 500 may determine that one or more processing nodes are unnecessary or should be repurposed, and either discard or reconfigure the processing nodes on that basis. As another example, the artificial neural network 500 may determine that further processing of all or part of the input is required and add additional processing nodes and/or sets of processing nodes on that basis.

The feedback provided by the feedback system 550 may be mere reinforcement (e.g., providing an indication that output is correct or incorrect, awarding the machine learning algorithm a number of points, or the like) or may be specific (e.g., providing the correct output). For example, the machine learning algorithm 500 may be asked to detect faces in photographs. Based on an output, the feedback system 550 may indicate a score (e.g., 75% accuracy, an indication that the guess was accurate, or the like) or a specific response (e.g., specifically identifying where the face was located).

The artificial neural network 500 may be supported or replaced by other forms of machine learning. For example, one or more of the nodes of artificial neural network 500 may implement a decision tree, associational rule set, logic programming, regression model, cluster analysis mechanisms, Bayesian network, propositional formulae, generative models, and/or other algorithms or forms of decision-making. The artificial neural network 500 may effectuate deep learning.

Systems, device, and methods as described herein may enable data processing at a central repository, with the data transformation rules being stored at edge computing devices. The data transformation rules remain at edge computers, and the data to be processed is substantially stored at the central repository, which may improve data security and confidentiality of the transformation rules. Further, the implementation of a distributed architecture (with multiple edge computing nodes) and a distributed hash table enables an additional layer of security by obscuring a node at which the data transformation rules are being applied.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system for rule-based data processing, the system comprising:
a plurality of edge computing nodes, wherein each of the edge computing nodes is associated with a corresponding set of data transformation rules; and
a central computing node comprising:
a processor; and
memory storing computer-readable instructions that, when executed by the processor, cause the central computing node to:
receive a first data set;
determine, an edge computing node, among the plurality of edge computing nodes, for processing the first data set;
send, to the edge computing node, a subset of the first data set, wherein the subset of the first data set comprises one or more records that are randomly selected from the first data set, and wherein the sending the subset of the first data set causes generating a second data set at the edge computing node based on applying a first set of data transformation rules associated with the edge computing node to the subset of the first data set;
receive, from the edge computing node, the second data set;
determine, using a machine learning (ML) algorithm based on the subset of the first data set and the received second data set, a second set of data transformation rules;
generate a third data set based on applying the second set of data transformation rules to a remainder of the first data set, wherein the remainder of the first data set does not include the subset of the first data set; and
send, to the edge computing node, at least a subset of the third data set.

2. The system of claim 1, wherein the instructions, when executed by the processor, cause the central computing node to determine the edge computing node by causing:
sending the first data set to the plurality of edge computing nodes; and
receiving, from one or more of the plurality of edge computing nodes, an indication of the edge computing node.

3. The system of claim 1, wherein the instructions, when executed by the processor, cause the central computing node to determine, based on a second ML algorithm, the subset of the first data set.

4. The system of claim 3, wherein the second ML algorithm is based on one of:
a logistic regression algorithm;
a decision tree algorithm;
a random forest algorithm;
a neural network algorithm;
a support vector machine (SVM) algorithm;
a clustering algorithm; and
combinations thereof.

5. The system of claim 1, wherein the determining the second set of data transformation rules comprises training a ML model based on the subset of the first data set and the received second data set.

6. The system of claim 5, wherein the ML model is based on one of:
a logistic regression model;
a decision tree model;
a random forest model;
a neural network;
a support vector machine (SVM); and
combinations thereof.

7. The system of claim 1, wherein the first set of data transformation rules comprises at least one rule for determining whether an entry in the subset of the first data set satisfies a condition.

8. The system of claim 1, wherein the first set of data transformation rules comprises at least one rule for generating an output value corresponding to an entry in the subset of the first data set.

9. The system of claim 1, wherein the second set of data transformation rules is the same as the first set of data transformation rules.

10. The system of claim 1, wherein the instructions, when executed by the processor, cause the central computing node to send the at least the subset of the third data set to the edge computing node for verification by the edge computing node.

11. A method at a central computing node, comprising:
receiving a first data set;
determining an edge computing node, among a plurality of edge computing nodes, for processing the first data set;
sending, to the edge computing node, a subset of the first data set, wherein the subset of the first data set comprises one or more records that are randomly selected from the first data set, wherein the sending the subset of the first data set causes generating a second data set at the edge computing node based on applying a first set of data transformation rules associated with the edge computing node to the subset of the first data set;
receiving, from the edge computing node, the second data set;
determining, using a machine learning (ML) algorithm based on the subset of the first data set and the received second data set, a second set of data transformation rules;
generating a third data set based on applying the second set of data transformation rules to a remainder of the first data set, wherein the remainder of the first data set does not include the subset of the first data set; and
sending, to the edge computing node, at least a subset of the third data set.

12. The method of claim 11, wherein the determining the edge computing node comprises:
sending the first data set to the plurality of edge computing nodes; and
receiving, from one or more of the plurality of edge computing nodes, an indication of the edge computing node.

13. The method of claim 11, further comprising determining, based on a second ML algorithm, the subset of the first data set.

14. The method of claim 13, wherein the second ML algorithm is based on one of:
a logistic regression algorithm;
a decision tree algorithm;
a random forest algorithm;
a neural network algorithm;
a support vector machine (SVM) algorithm;
a clustering algorithm; and
combinations thereof.

15. The method of claim 11, wherein the determining the second set of data transformation rules comprises training a ML model based on the subset of the first data set and the received second data set.

16. The method of claim 15, wherein the ML model is based on one of:
a logistic regression model;
a decision tree model;
a random forest model;
a neural network;
a support vector machine (SVM); and
combinations thereof.

17. The method of claim 11, wherein the first set of data transformation rules comprises at least one rule for determining whether an entry in the subset of the first data set satisfies a condition.

18. The method of claim 11, wherein the first set of data transformation rules comprises at least one rule for generating an output value corresponding to an entry in the subset of the first data set.

19. The method of claim 11, wherein the second set of data transformation rules is the same as the first set of data transformation rules.

20. One or more non-transitory computer-readable media storing instructions that, when executed by a computing platform comprising at least one processor and memory, cause the computing platform to:
receive a first data set;
determine, an edge computing node, among a plurality of edge computing nodes, for processing the first data set;
send, to the edge computing node, a subset of the first data set, wherein the subset of the first data set comprises one or more records that are randomly selected from the first data set, wherein the sending the subset of the first data set causes generating a second data set at the edge computing node based on applying a first set of data transformation rules associated with the edge computing node to the subset of the first data set;
receive, from the edge computing node, the second data set;
determine, using a machine learning (ML) algorithm based on the subset of the first data set and the received second data set, a second set of data transformation rules;
generate a third data set based on applying the second set of data transformation rules to a remainder of the first data set, wherein the remainder of the first data set does not include the subset of the first data set; and
send, to the edge computing node, at least a subset of the third data set.

* * * * *